US012253678B2

(12) United States Patent
Verma et al.

(10) Patent No.: US 12,253,678 B2
(45) Date of Patent: *Mar. 18, 2025

(54) APPARATUS AND METHODS TO EXTRACT DATA WITH SMART GLASSES

(71) Applicant: Bank of America Corporation, Charlotte, NC (US)

(72) Inventors: Sandeep Verma, Gurugram (IN); Nandini Rathaur, Hyderabad (IN); Pavan Chayanam, Alamo, CA (US); Srinivas Dundigalla, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,301

(22) Filed: Feb. 9, 2024

(65) Prior Publication Data

US 2024/0184115 A1    Jun. 6, 2024

Related U.S. Application Data

(63) Continuation of application No. 17/692,283, filed on Mar. 11, 2022, now Pat. No. 11,933,986.

(51) Int. Cl.
*G02B 27/01* (2006.01)
*G06T 11/60* (2006.01)
(Continued)

(52) U.S. Cl.
CPC .......... *G02B 27/0172* (2013.01); *G06T 11/60* (2013.01); *G06T 19/006* (2013.01);
(Continued)

(58) Field of Classification Search
CPC ................ G09G 5/02; G09G 2354/00; G09G 2320/0666; G09G 2340/06; G06T 5/90; G06T 2207/10024; H04N 1/60
See application file for complete search history.

(56) References Cited

U.S. PATENT DOCUMENTS 7,872,593 B1    1/2011 Rauscher et al.
8,108,408 B2    1/2012 Kondo et al.
(Continued)

OTHER PUBLICATIONS

Ajanki et al., An augmented reality interface to contextual information, Dec. 16, 2010, Virtual Reality SI: Augmented realty, pp. 161-173 (Year: 2010).*

(Continued)

*Primary Examiner* — Motilewa Good-Johnson
(74) *Attorney, Agent, or Firm* — Weiss & Arons LLP

(57) ABSTRACT

Apparatus and methods are provided for extracting and displaying information and data from a stream of information on a pair of smart glasses. One or more content filters describing the desired information and data may be communicated to a content filtering module. The content filtering module may process the stream of information to search for the desired information and data. When the desired information is found within the stream of information, the content filtering module may highlight the desired information, while blurring all other information, within a display on the pair of smart glasses.

19 Claims, 6 Drawing Sheets

(51) Int. Cl.
*G06T 19/00* (2011.01)
*G06V 30/18* (2022.01)

(52) U.S. Cl.
CPC ............ *G06V 30/18019* (2022.01); *G02B 2027/0141* (2013.01); *G02B 2027/0178* (2013.01)

(56) References Cited

U.S. PATENT DOCUMENTS

| | | | |
|---|---|---|---|
| 9,589,149 B2 * | 3/2017 | Livshits | G06F 21/6245 |
| 10,741,173 B2 * | 8/2020 | Kline | G10L 15/1815 |
| 10,996,741 B2 | 5/2021 | Bastide et al. | |
| 11,126,846 B2 | 9/2021 | Neumann et al. | |
| 11,194,971 B1 | 12/2021 | Dobranic | |
| 11,195,315 B2 | 12/2021 | Jones et al. | |
| 11,687,216 B2 | 6/2023 | Zionpour et al. | |
| 2013/0127980 A1 | 5/2013 | Haddick et al. | |
| 2013/0278631 A1 | 10/2013 | Border et al. | |
| 2015/0215253 A1 * | 7/2015 | Vemuri | H04L 51/212 |
| | | | 709/206 |
| 2015/0261867 A1 | 9/2015 | Singal et al. | |
| 2016/0301953 A1 | 10/2016 | Garcia Navarro et al. | |
| 2017/0200296 A1 | 7/2017 | Jones et al. | |
| 2017/0262045 A1 | 9/2017 | Rouvinez et al. | |
| 2018/0018348 A1 | 1/2018 | Qin et al. | |
| 2020/0125322 A1 | 4/2020 | Wilde | |
| 2020/0160578 A1 * | 5/2020 | Jones | G09G 5/34 |
| 2020/0193081 A1 * | 6/2020 | Salama | G06F 40/103 |
| 2020/0218585 A1 | 7/2020 | Dotan-Cohen et al. | |
| 2021/0004770 A1 | 1/2021 | Bansal et al. | |
| 2021/0064871 A1 | 3/2021 | Sohn et al. | |
| 2021/0097762 A1 | 4/2021 | Spivak et al. | |
| 2021/0329338 A1 | 10/2021 | Khov et al. | |
| 2021/0365502 A1 | 11/2021 | Hutchins | |
| 2022/0027626 A1 * | 1/2022 | Kharbanda | G06F 16/953 |
| 2022/0375172 A1 | 11/2022 | Meisenholder et al. | |
| 2023/0269255 A1 | 8/2023 | Bacastow et al. | |
| 2023/0288704 A1 | 9/2023 | Verma et al. | |

OTHER PUBLICATIONS

Ajanki et al., An augmented reality interface to contextual information, 2011, Virtual reality, Springer pp. 161-173.*

* cited by examiner

APPARATUS AND METHODS TO EXTRACT DATA WITH SMART GLASSES

CROSS REFERENCE TO RELATED APPLICATION

This application is a continuation of U.S. patent application Ser. No. 17/692,283, filed on Mar. 11, 2022 and entitled "APPARATUS AND METHODS TO EXTRACT DATA WITH SMART GLASSES," which is hereby incorporated by reference herein in its entirety.

FIELD OF TECHNOLOGY

This application provides apparatus and methods for extracting, filtering and creating a separate view of data or information with smart glasses.

BACKGROUND

For the purposes of this disclosure, a pair of smart glasses (which may be referred to as a "smart glass") may be understood to mean wearable eyeglasses that include one or more processors, displays, network interface cards, and memory, as well as a frame and other related components.

Often, customers, users, employees or others may be in front of live, constantly updating screens streaming information. These screens may be continuously, or at set intervals, refreshed with a stream of updated information. For example, stock ticker screens and airport flight information screens.

The viewers may be interested in only a limited subset of information available and displayed on the screen, such as a particular flight, or a particular stock. It may be difficult to search and filter the desired information from the live streaming data. In addition, the information may be updated after the viewer looks away from the screen, preventing the user from having the most up-to-date information.

A technology which can allow users to extract, filter-out and create a separate or distinct view of the information that users are interested in on a pair of smart glasses, from a live stream of a large data set may be useful in providing desired information to a user. This technology may enhance customer or user experience and save time.

Therefore, it would be desirable to provide apparatus and methods to extract and display desired information to a user wearing smart glasses from a stream of information.

SUMMARY OF THE DISCLOSURE

It is an object of this disclosure to provide apparatus and methods to extract and display desired information from a stream of displayed information to a user wearing smart glasses.

In this disclosure, a single pair of smart glasses may be referred to as a "smart glass". Each smart glass may belong to, be assigned to, or worn by a single distinct user. In an embodiment, smart glasses may include virtual reality headsets or other virtual reality apparatus.

Each smart glass may include a frame, one or more lenses, a display, an input/output ("I/O") module, a network interface card ("NIC"), a processor, and a non-transitory memory. The display may be an LED (light emitting diode) or OLED (organic light emitting diode) display, or any other suitable display.

An apparatus for extracting and displaying key information on a pair of smart glasses is provided. The smart glasses may include a display, a camera, an input/output ("I/O") module, a network interface card ("NIC"), non-transitory memory, and a processor.

The non-transitory memory may store an operating system. The processor may be configured to operate at least the operating system, the NIC, the camera, the display and the I/O module.

The apparatus may include a backend computer. The backend computer may be a server, a mobile computing device (such as a smartphone or a tablet), a wearable computer, or other computer. In an embodiment, the smart glasses may include the backend computer.

The backend computer may include a backend input/output ("bI/O") module, a backend network interface card ("bNIC"), a backend non-transitory memory, and a backend processor. The non-transitory memory may be configured to store at least a backend operating system and a content filtering module.

The backend processor may be configured to operate at least the backend operating system, the content filtering module, the bNIC, and the bI/O module.

In operation, one or more content filters may be communicated/transferred to the content filtering module. The camera on the smart glasses may capture images of a stream of information. The images may be still or motion images. The content filtering module may be configured to convert the one or more content filters into one or more keys or keywords. The module may also convert the captured stream of information into an array of images. For example, if the stream of information is a list of stocks and prices, with each stock on a separate line, the module may break the image/video of the list into an array of images, where each image in the array is one line of the list of stocks and prices.

The content filtering module may process each image in the array of images to convert each image into text. The module may convert any letters, numbers, or symbols into text. The module may utilize an optical character recognition ("OCR") method or any other suitable method to convert any letters, numbers, or symbols in each of the images in the array into text.

The content filtering module may search the text for the one or more keys. When the module discovers one of the one or more keys in the text, it may display the corresponding image (i.e., the image from which the text was converted) from the array of images on the display of the smart glasses. The module may then blur all remaining images from the array of images and displays the blurred images on the display. This may provide a distinct or highlighted composite image in the display that shows the wearer/user of the smart glasses the information requested. Blurring the other information may help to highlight the desired information.

In an embodiment, the backend computer may be a mobile device located proximate to the user. For example, it may be a smartphone belonging to the user.

In an embodiment, the backend computer may be wired to the pair of smart glasses and communicate through the wired connection. In an embodiment, the backend computer may communicate wirelessly with the pair of smart glasses.

In an embodiment, the content filtering module may convert non-text inputs (e.g., speech or gestures) from the user into text via natural language processing. These inputs may be how the user communicates the content filters to the content filtering module. In an embodiment, the one or more content filters may be communicated to the content filtering module by a user through the I/O module.

In an embodiment, the content filtering module may be configured to use one or more artificial intelligence/machine learning ("AI/ML") algorithms to search, convert, process, display, or perform any of its other functions.

In an embodiment, the one or more content filters may be communicated to the content filtering module by a mining module configured to mine a user's emails and text messages. The mining module may be located at the backend computer or on the smart glasses.

In an embodiment, the stream of information may be a livestream visible to the user through the pair of smart glasses.

In an embodiment, the content filtering module may provide one or more further updates to the user after the user moves away from the livestream. For example, after displaying particular flight information, the content filtering module may search the Internet for updates to the flight information, even after the airport screen is no longer visible through the smart glasses.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
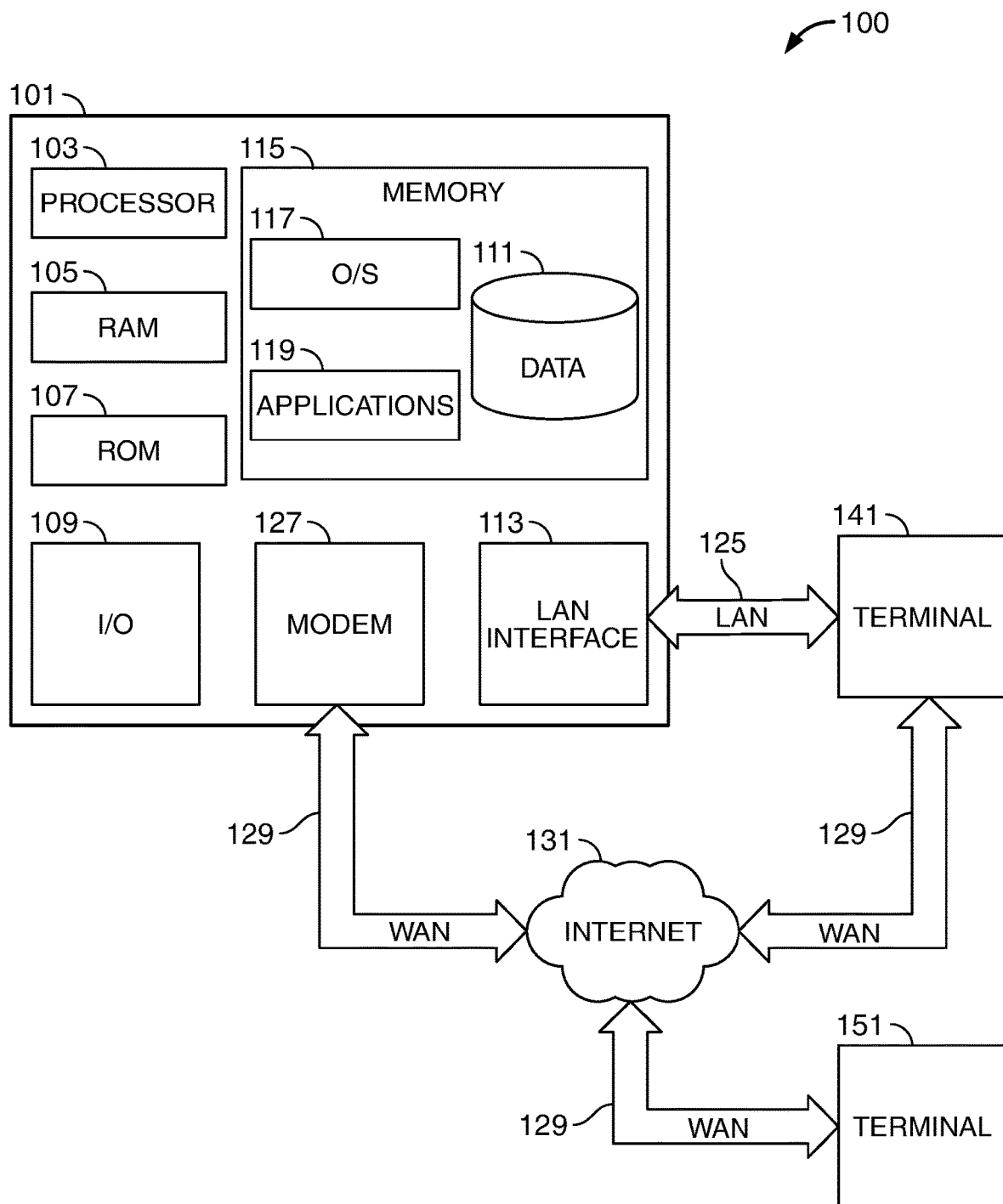
FIG. 1 shows illustrative apparatus in accordance with principles of the disclosure.

In this disclosure, a single pair of smart glasses may be referred to as a "smart glass". In an embodiment, smart glasses may include virtual reality headsets or other virtual reality apparatus. Smart glasses may include various computerized components in various locations. Some may include components on a frame or separate from a frame but connected through a wire or wirelessly.

Each smart glass may include a frame, one or more lenses, a display, an input/output ("I/O") module, a network interface card ("NIC"), a processor, and non-transitory memory. The display may be an LED (light emitting diode) or OLED (organic light emitting diode) display, or any other suitable display. OLED displays may be more environmentally friendly as well as more power-efficient. The display may act as a 'heads-up' display, or a screen to reflect a projection. The display may be configured to only be visible and legible to the user when the user is wearing the smart glass. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display (hereinafter, "LCD") power must be supplied to the entire backlight even to illuminate just one pixel in the display. In contrast, an OLED display does not necessarily include a backlight. Furthermore, in an OLED display, preferably, only the illuminated pixel draws power. Therefore, power efficiency of OLED technology presents a possibility for designing payment instruments that provide enhanced security and functionality.

The I/O module may include any apparatus to manipulate any item appearing on the display, including a keyboard, mouse, hand gesture tracker, eye tracker, virtual keyboard, camera, radar, or any other appropriate apparatus. The I/O module may include a microphone, button(s) and/or touch screen which may accept user provided input. The I/O module may include one or more of a speaker for providing audio output and a video display for providing textual, audiovisual and/or graphical output.

An apparatus for extracting and displaying key information on a pair of smart glasses is provided. Key information may be determined by a user or by the apparatus. Key information, i.e., information desired or sought by a user, may be modified and changed at any time. The key information may be communicated to the apparatus through one or more content filters. A user or the apparatus may set the one or more content filters. The smart glasses may include a display, a camera, an input/output ("I/O") module, a network interface card ("NIC"), non-transitory memory, and a processor.

The non-transitory memory may store an operating system as well as one or more applications. The processor may be configured to operate at least the operating system, the NIC, the camera, the display and the I/O module. The operating system may be modifiable by the user. The operating system may include various software applications, including a content filtering module, mining module, and display module.

The apparatus may include a backend computer. The backend computer may be a server, a mobile computing device (such as a smartphone or a tablet), a wearable computer, or other computer. A computer separate from the smart glasses may be more powerful than a computer included with a pair of smart glasses, due to size, power, weight, and other component characteristics. However, the larger (and more powerful) the backend computer may be, the less portable it may become. If the backend computer is less portable, there may be a larger communication lag between it and the smart glasses. The longer a communication lag may be, the less efficient and useful the apparatus may be to a user looking at a busy information stream.

In an embodiment, the smart glasses may include the backend computer. This may increase the speed at which the apparatus can extract and display the key information, as there may be less communication lag between the backend computer and smart glasses if it is all one physical unit. In an embodiment, the smart glasses may be directly connected to the backend computer, wirelessly (e.g., through bluetooth, cellular signal, or wi-fi) or through a wire. In an embodiment, the backend computer may communicate with the pair of smart glasses over a network. In an embodiment, the network may be the Internet.

In an embodiment, communications between the smart glasses and the backend computer may be encrypted. Any suitable encryption method or algorithm may be used.

The backend computer may include a backend input/output ("bI/O") module, a backend network interface card ("bNIC"), a backend non-transitory memory, and a backend processor. The non-transitory memory may be configured to store at least a backend operating system and a content filtering module. The backend memory may also store additional applications or fragments of applications, as necessary. The backend processor may be configured to operate at least the backend operating system, the content filtering module, other applications, the bNIC, and the bI/O module.

In operation, one or more content filters may be communicated/transferred to the content filtering module. A user or the apparatus may communicate the content filters to the module. For example, a user may set a content filter to find and display content relating to a specific flight or a specific stock. The user may say, 'update me on flight 100.' A microphone (or other input device) on the smart glasses may hear the user and transmit the request as a content filter. Any suitable content filter setting method may be used (e.g., typing, speaking, gestures, or combinations thereof). In various embodiments, the content filter(s) may be set by the backend computer, or another computer. For example, a computer may mine (search) a user's emails or other information for information an algorithm may decide the user would be interested in, such as a particular stock or a particular flight. The algorithm may be an artificial intelligence/machine learning algorithm or algorithms.

In an embodiment, the backend computer or other computer may display advertisements, or block advertisements, the user may be interested in. For example, if the user is at a sporting event that displays multiple advertisements, the content filter module may highlight one or more specific advertisements according to one or more parameters set in the content filtering module. If the content filtering module is set to block one or more advertisements, the apparatus may visibly blur or delete the one or more advertisements from the display.

The camera on the smart glasses may capture images of a stream of information. The stream of information may include anything the user sees through the lenses of the smart glasses. The images may be still or motion images. The camera may track the user's eyes and capture an image or images of what the user is looking at through the smart glasses.

The content filtering module may be configured to convert the one or more content filters into one or more keys or keywords. Converting the one or more content filters into keys or keywords may increase the processing speed of the apparatus and allow broader content filters to be set. For example, a user may simply say, "show me my stocks." The content filtering module, may interpret that command, combine it along with other knowledge (i.e., the specific stocks), and create keywords of each stock ticker belonging to the user. Searching for keywords instead of the more nebulous command of "show me my stocks" may be easier for the module to compute and process.

The module may also convert the captured stream of information into an array of images. The module may determine how many images to convert and what size each image in the array should be. The module may make this determination by reviewing the image and breaking it into more manageable pieces. For example, if the stream of information is a list of stocks and prices, with each stock on a separate line, the module may break the image/video of the list into an array of images, where each image in the array is one line of the list of stocks and prices or the background/surroundings of the list. However, if the stream of information only includes one line of stocks, it may be unnecessary or counterproductive to create an array of images. Depending on the stream of information, it may not be possible to produce an array of images.

The content filtering module may process each image in the array of images to convert all or a portion of each image into searchable text. The module may convert any letters, numbers, or symbols into text. The module may utilize an optical character recognition ("OCR") method or any other suitable method to convert any letters, numbers, or symbols in each of the images in the array into text. For example, if an image in the array includes flight information, the module may convert the flight information into text. The text may be searchable.

The content filtering module may search the text for the one or more keys or keywords. When the module discovers one of the one or more keys/keywords in the text, it may display the corresponding image (i.e., the image from which the text was converted) from the array of images on the display of the smart glasses. For example, if the image array contains ten images, each corresponding to one line of a flight information board, and the fourth image/line includes the flight information that was set in the keywords, the module may display (and highlight) that fourth image on the display of the smart glasses. The module may then blur all remaining images from the array of images and displays the blurred images on the display. This may provide a distinct or highlighted composite image in the display that shows the wearer/user of the smart glasses the information requested. Blurring the other information may help to highlight the desired information. Other techniques or methods to highlight the desired information may be used, such as surrounding the image with a box or color.

In an embodiment, the module may display only the image from the array including the keys/keywords; the remaining images in the array may not be displayed. For example, the module may discover three lines (images in the array) in a stream of information that each include keys/keywords. The module may display those three images and nothing else. In an embodiment, the module may stitch those images together to create one image for display.

In an embodiment, the backend computer may be a mobile device located proximate to the user. For example, it may be a smartphone or other smart mobile device (e.g., a smartwatch) belonging to the user.

In an embodiment, the backend computer may be wired to the pair of smart glasses and communicate through the wired connection. In an embodiment, the backend computer may communicate wirelessly with the pair of smart glasses. Wireless communications may occur over wi-fi, bluetooth, cellular connections, and any other suitable communication protocol.

In an embodiment, the content filtering module may convert non-text inputs (e.g., speech or gestures) from the user into text via natural language processing. These inputs may be how the user communicates the content filters to the content filtering module. For example, a user may say, "please provide information on stock ABC"; the module may use natural language processing, or other methods, to convert that statement into text (i.e., keys or keywords).

In an embodiment, the one or more content filters may be communicated to the content filtering module by a user through the I/O module. Alternatively, the one or more content filters may be transmitted to the content filtering module in advance of the user wearing the smart glasses, for example, by setting a filter on a personal computer or smartphone.

In an embodiment, the content filtering module may be configured to use one or more artificial intelligence/machine learning ("AI/ML") algorithms to search, convert, process, display, or perform any of its other functions. For example, the module may use one or more AI/ML algorithms to convert the stream of information into an array of images. An AI/ML algorithm may assist the module when deciding how many images there should be in the array or other decisions. One or more AI/ML algorithms may increase the speed of the module and allow it to display information in real-time, or close to real-time.

In an embodiment, the one or more content filters may be communicated to the content filtering module by a mining module configured to mine a user's emails and text messages. The mining module may be located at the backend computer or on the smart glasses. In an embodiment, the mining module may be a sub-module to the content filtering module.

The mining module may utilize one or more AI/ML algorithms to mine information for setting one or more content filters. In an embodiment, the information mined may include a user's emails, a user's text messages, a user's social media posts, a user's calendar, or other information available to the mining module. Incorporating a mining module into the apparatus may increase the use of the apparatus and allow for increased seamless information display. For example, a mining module may have access to a user's calendar. When the module mines the calendar it may discover that the user has a flight scheduled. The module may set a content filter based on the flight in the calendar, all without the user interacting with the content filtering module.

In an embodiment, the user may provide access to a mining module in particular sources of information, and deny access to other sources of information. For example, a user may allow the mining module to access her calendar, but also deny access to her emails.

In an embodiment, the stream of information may be a livestream visible to the user through the pair of smart glasses. For example, the user may look at a computer screen that is displaying a live stream of information (such as a stock ticker or flight information) through the smart glasses. The more efficient the apparatus, the more information that may be processed through the filter.

In an embodiment, the content filtering module may provide one or more further updates to the user after the user moves away from the livestream. For example, after displaying particular flight information, the content filtering module may search the Internet for updates to the flight information, even after the airport screen is no longer visible through the smart glasses. The module may search the Internet, or other source of information, for these further updates. The module may present the updates in the same or similar manner as previously displayed to the user (i.e., generate an image including the update(s)). The module may present the updates in a manner different than that previously displayed to the user.

A method for extracting and displaying key information on a pair of smart glasses is provided. The method may include communicating one or more filter terms to a content filtering module. The content filtering module may be located at the smart glasses or at a separate computer. The method may include converting, by the content filtering module, the one or more filter terms into one or more keys. The method may include capturing a stream of information with a camera located on the smart glasses. The stream of information may be a continuously updated video screen (a livestream) visible to the wearer of the smart glasses, displaying various information, such as flight information or stocks. The method may include converting, by the content filtering module, the stream of information captured by the camera into an array of images. The method may include processing, by the content filtering module, the array of images. Processing may include scanning the images and locating any text (including characters, numbers, and symbols), and discarding any images in the array that do not have text.

The method may include extracting, by the content filtering module, all textual characters, numbers, and symbols from the processed array of images, and searching, by the content filtering module, the extracted textual characters, numbers, and symbols for a match between the extracted textual characters, numbers, and symbols and the one or more keys. For example, if the content filter is looking for the airport code for Phoenix—PHX—, the module may search the extracted text from the images in the array for "PHX". When the content filtering module finds a match, it may display, on the smart glasses, a corresponding image from the array of images; and blur (and display) all remaining images from the array of images.

In an embodiment, the content filtering module may be located at a mobile device proximate to the smart glasses, such as a smartphone or tablet.

In an embodiment, the content filtering module may be located at a server remote from the smart glasses. The server may be centralized or distributed.

In an embodiment, the content filtering module may provide further updates to the user, after the user moves away from the livestream, by searching the Internet or other network for updated information.

In an embodiment, the content filtering module may be configured to use one or more artificial intelligence/machine learning ("AI/ML") algorithms to perform one or more of its functions.

In an embodiment, when the module discovers one of the one or more keys in the text, the module may create a virtual view within the display, cut a key image corresponding to the discovered key, and display the key image within the virtual view. In this embodiment, the remaining images are not blurred and are not displayed in the display. This embodiment may be more useful if the content filter is searching for numerous keys (such as three or four stocks or flights), instead of one or two keys. These keys may appear at different points in the livestream and it may be useful to find the desired information and cut and paste the information together.

In an embodiment, the content filtering module may automatically find and highlight one or more anomalies within the array of images.

Each smart glass may include a frame, one or more lenses, a display, an input/output ("I/O") module, a network interface card ("NIC"), a processor, and a non-transitory memory. The I/O module may include any apparatus to manipulate any item appearing on the display, including a keyboard, mouse, hand gesture tracker, eye tracker, virtual keyboard, camera, radar, or any other appropriate apparatus. The I/O module may include a microphone, button(s) and/or touch screen which may accept user provided input. The I/O module may include one or more of a speaker for providing audio output and a video display for providing textual, audiovisual and/or graphical output. The display may be an LED (light emitting diode) or OLED (organic light emitting diode) display, or any other suitable display. The display may act as a 'heads-up' display, or a screen to reflect a projection. The display may be configured to only be visible and legible to the user when the user is wearing the smart glass. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display (hereinafter, "LCD") power must be supplied to the entire backlight even to illuminate just one pixel in the display. In contrast, an OLED display does not necessarily include a backlight. Furthermore, in an OLED display, preferably, only the illuminated pixel draws power. Therefore, power efficiency of OLED technology presents a possibility for designing payment instruments that provide enhanced security and functionality.

Smart glasses, and backend computers, may each include an embedded network interface card (referred to as an "NIC" or "bNIC"). The NIC may implement protocols for wireless communication. The NIC may provide Wi-Fi, Near Filed Communication ("NFC"), cellular (including 5g), Bluetooth or any other suitable mode of wireless communication. Wi-Fi may include passive Wi-Fi having lower power consumption than typical Wi-Fi. The NIC may have a thickness that is not greater than 0.8 mm. Such a NIC may be referred to herein as a nano-NIC ("nNIC").

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with any computing device where the user may attempt to authenticate from as well as any server or servers. The communication link may include any necessary hardware (e.g., antennae) and software to control the link. Any appropriate communication link may be used. In an embodiment, the network used may be the Internet. In another embodiment, the network may be an internal intranet.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 is a block diagram that illustrates a computing device/apparatus 100 that may be used in accordance with the principles of the invention. The smart glasses 101 may have a processor 103 for controlling overall operation of the smart glasses and its associated components, including RAM 105, ROM 107, input/output ("I/O") module 109, and memory 115.

I/O module 109 may include a microphone, keypad, touchscreen, microphone, camera/eye tracker, stylus, or other apparatus through which a user of device 101 may provide input and may also include one or more of a speaker for providing audio output and a video display device for providing textual, audiovisual and/or graphical output. Software may be stored within memory 115 and/or other storage (not shown) to provide instructions to processor 103 for enabling smart glasses 101 to perform various functions, such as identifying and displaying desired information. For example, memory 115 may store software used by smart glasses 101, such as an operating system 117, application programs 119, and an associated database.

Alternatively, some or all of computer executable instructions of smart glasses 101 may be embodied in hardware or firmware (not shown).

Smart glasses 101 may operate in a networked environment supporting connections to one or more remote computers, such as terminals 141 and 151. Terminals 141 and 151 may be backend computers, servers, or other smart glasses that include many or all of the elements described above relative to smart glasses 101. The network connections depicted in FIG. 1 include a local area network (LAN) 125 and a wide area network (WAN) 129 but may also include other networks.

When used in a LAN networking environment, computer 101 is connected to LAN 125 through a network interface or adapter 113.

When used in a WAN networking environment, smart glasses 101 may include a modem 127 or other means for establishing communications over WAN 129, such as Internet 131. Bluetooth, cellular, NFC or other communication protocols may also be used.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to utilize the apparatus. Any of various conventional web browsers may be used to display and manipulate data on web pages. It is anticipated that the apparatus may be used to identify and display desired information on the smart glasses.

Additionally, application program 119, which may be used by smart glasses 101, may include computer executable instructions for invoking user functionality related to communication, such as email, short message service (SMS), authentication services and voice input and speech recognition applications.

Smart glasses 101 and/or terminals 141 or 151 may also be referred to as nodes on a network and may be mobile terminals including various other components, such as a battery, speaker, and antennas (not shown). Terminal 151 and/or terminal 141 may be portable devices such as smart glasses or any other suitable device for receiving, storing, transmitting and/or displaying relevant information, such as identifying and displaying desired information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform various functions such identifying and displaying desired information, communicating with other computers or smart glasses, and/or performing any other suitable tasks.

In addition to smart glasses, the invention may be operational with numerous other general purpose or special purpose computing system environments or configurations, particularly with respect to the backend computer(s). Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
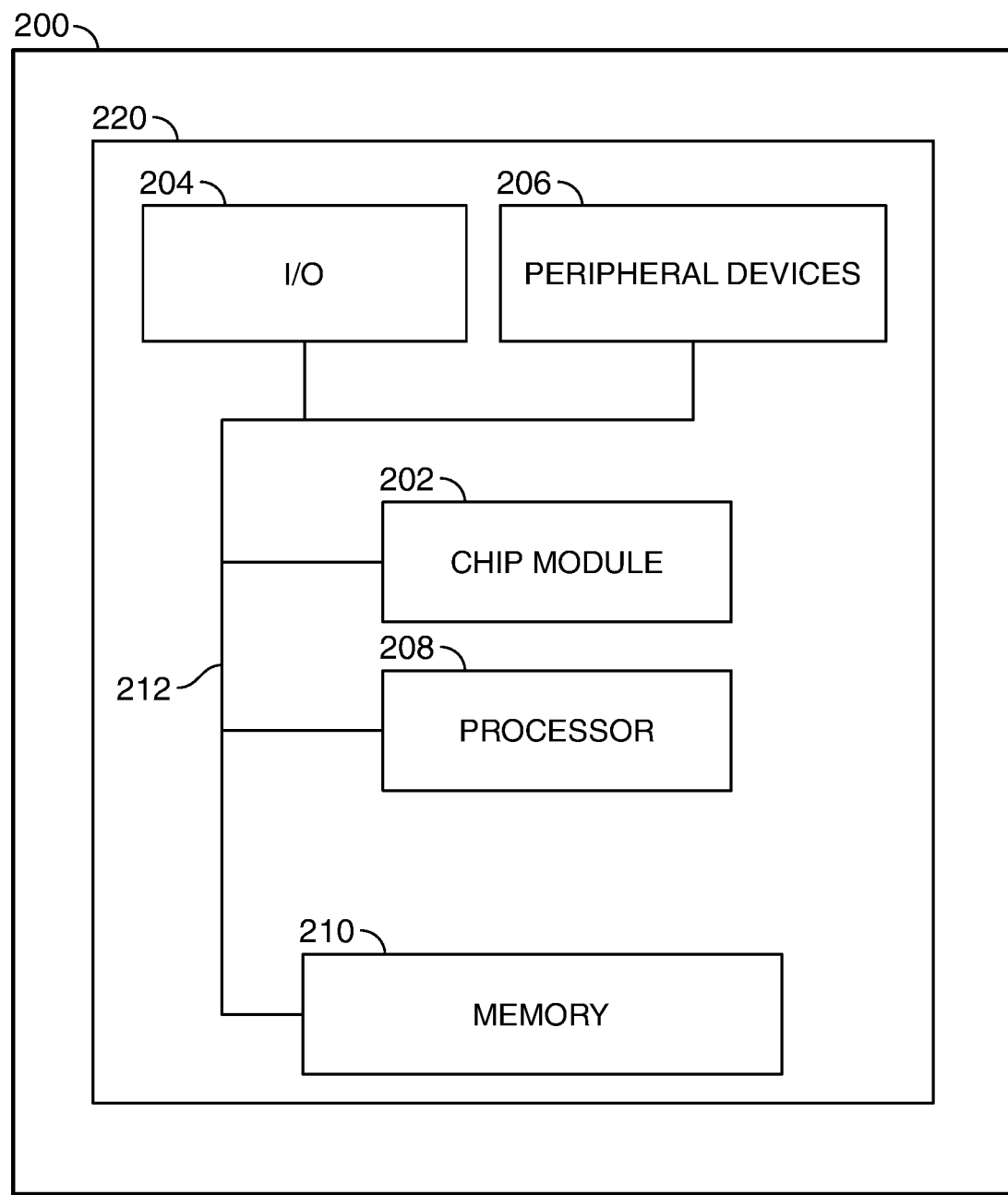
FIG. 2 shows illustrative apparatus in accordance with principles of the disclosure.

FIG. 2 shows an illustrative apparatus 200 that may be configured in accordance with the principles of the invention.

Apparatus 200 may be a computing machine, such as a pair of smart glasses. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may run any software application or applications described herein; and machine-readable memory 210.

Machine-readable memory 210 may be configured to store in machine-readable data structures: data, programming functions, units of programming code associated with the programming functions and any other suitable information or data structures.

Components 202, 204, 206, 208 and 210 may be coupled together by a system bus or other interconnections 212 and may be present on one or more circuit boards such as 220.

In some embodiments, the components may be integrated into a single chip. The chip may be silicon-based.

Figure 3:
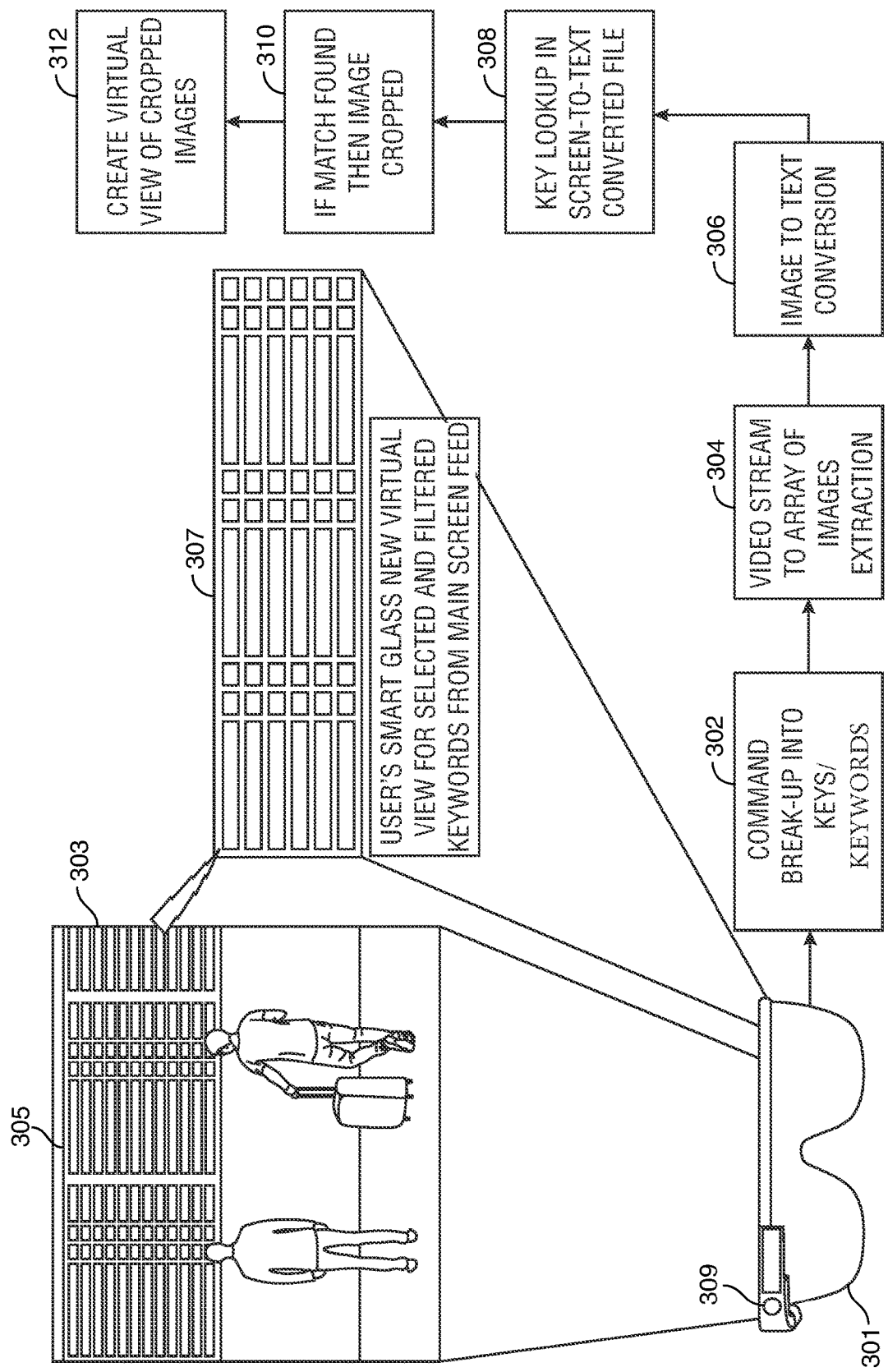
FIG. 3 shows an illustrative schematic in accordance with the principles of the disclosure.

FIG. 3 shows an illustrative schematic in accordance with the principles of the disclosure. Methods may include some or all of the method steps even-numbered 302 through 312, performed on apparatus odd-numbered 301 through 309, or other apparatus. Methods may include the steps illustrated in FIG. 3 in an order different from the illustrated order. The illustrative method shown in FIG. 3 may include one or more steps performed in other figures or described herein. Steps 302 through 312 may be performed on the apparatus shown in FIGS. 1-6, or other apparatus.

Smart glasses 301 may be worn by a user (not shown). A stream of information 305 may be seen in view 303 through the smart glasses 301 and captured by a camera 309 on the smart glasses 301. Information desired by the user may be collated and displayed on the smart glasses 301 in a virtual view 307.

The smart glasses 301, through a computer (not shown), which may be a backend computer, and which may be separate or a part of the smart glasses 301 may collate and display the desired information through steps 302 through 312. At step 302, a command input by the user or automatically by a computer to set a content filter may be broken up into keys/keywords. Voice and other inputs may be processed through natural language processing, speech-to-text algorithms, or other methods to determine the keys/keywords of desired information. This may be referred to as setting one or more content filters. The video stream 305 captured by camera 309 may be broken into an array of images at step 304 at a backend computer, the smart glasses, a server, or other computing device. At step 306, the images may be converted to text. This conversion may take place at a at a backend computer, the smart glasses, a server, or other computing device. At step 308, the converted text may be searched for the keys/keywords. At step 310, if a match is found in a particular image, or portion of an image, the image may be cropped to show the match. Various methods, including AI/ML algorithms may be used to determine what image, or part of an image may be cropped. In an embodiment, multiple images may be cropped, especially if there are multiple keys or keywords being searched for. At step 312, the cropped image or images may be stitched together to create a virtual view 307 and displayed on the smart glasses 301. Various methods, including AI/ML algorithms may be used to determine how to create and display the virtual view (e.g., which cropped images and in what order should they be displayed).

Figure 4:
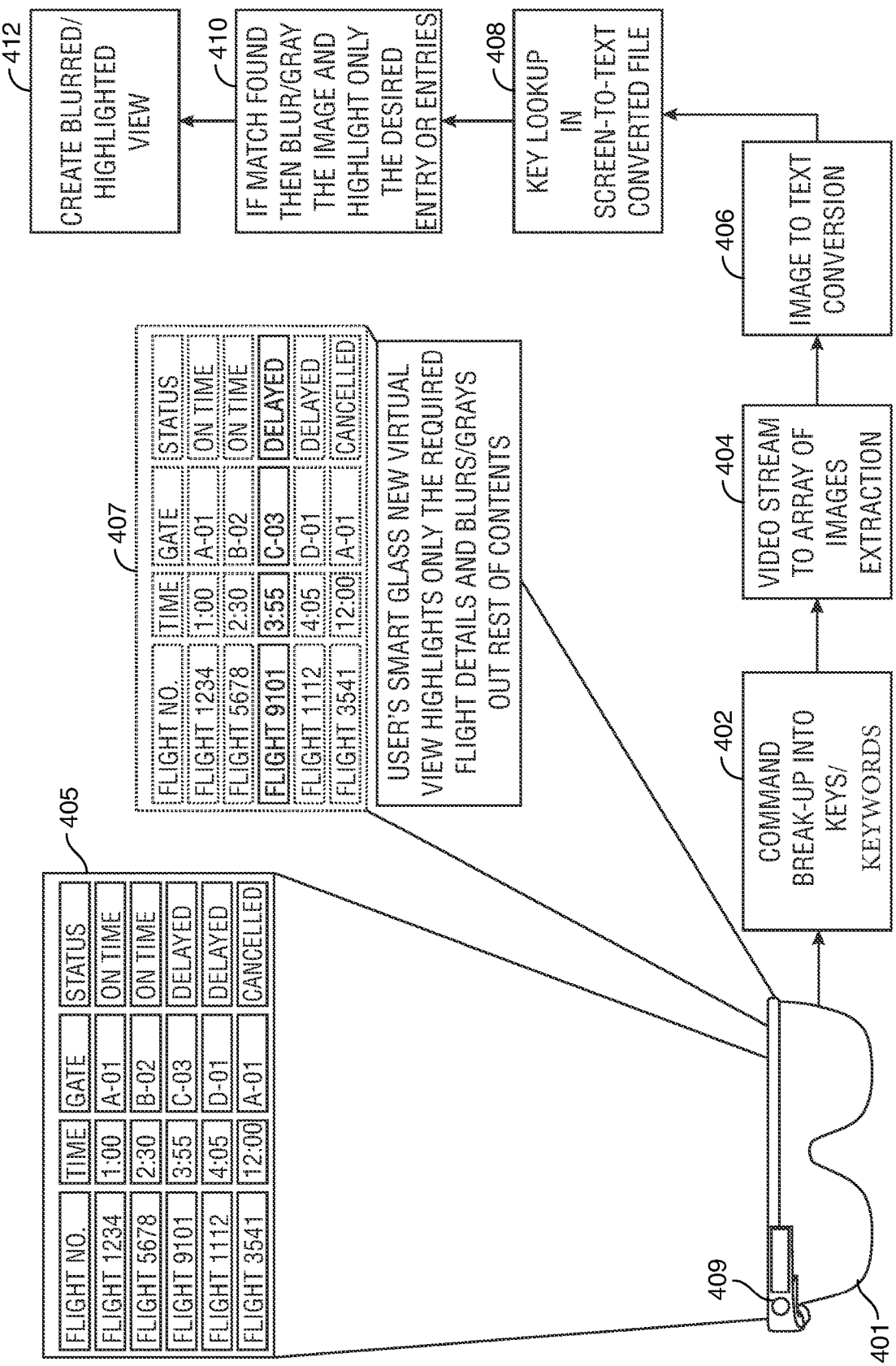
FIG. 4 shows an illustrative schematic of the network shown in FIG. 3.

FIG. 4 shows an illustrative schematic in accordance with the principles of the disclosure. Methods may include some or all of the method steps even-numbered 402 through 412, performed on apparatus odd-numbered 401 through 409, or other apparatus. Methods may include the steps illustrated in FIG. 4 in an order different from the illustrated order. The illustrative method shown in FIG. 4 may include one or more steps performed in other figures or described herein. Steps 402 through 412 may be performed on the apparatus shown in FIGS. 1-6, or other apparatus.

Smart glasses 401 may be worn by a user (not shown). A stream of information 405 may be viewed through the smart glasses 401 and captured by a camera 409 on the smart glasses 401. Information desired by the user may be highlighted and displayed on the smart glasses 401 while the remaining/surrounding information is blurred, as shown in view 407.

The smart glasses 401, through a computer (not shown), which may be a backend computer, and which may be separate or a part of the smart glasses 401 may identify, highlight, and display the desired information through steps 402 through 412. At step 402, a command input by the user or automatically by a computer to set a content filter may be broken up into keys/keywords. Voice and other inputs may be processed through natural language processing, speech-to-text algorithms, or other methods to determine the keys/keywords of desired information. This may be referred to as setting one or more content filters.

The video stream 405 captured by camera 409 may be broken into an array of images at step 404, at a backend computer, the smart glasses, a server, or other computing device. At step 406, the images may be converted to text. This conversion may take place at a at a backend computer, the smart glasses, a server, or other computing device. At step 408, the converted text (in a file) may be searched for the keys/keywords. At step 410, if a match is found in a particular image, or portion of an image, the rest of the image or images may be blurred to highlight the match or matches. Various methods, including AI/ML algorithms may be used to determine what image, or part of an image may be blurred or highlighted. In an embodiment, multiple images may be blurred and stitched together, especially if there are multiple keys or keywords being searched for. At step 412, the highlighted information and blurred information may be displayed on the smart glasses 401, as seen in view 407. Various methods, including AI/ML algorithms may be used to determine how to create and display the virtual view (e.g., which cropped images and in what order should they be displayed).

Figure 5:
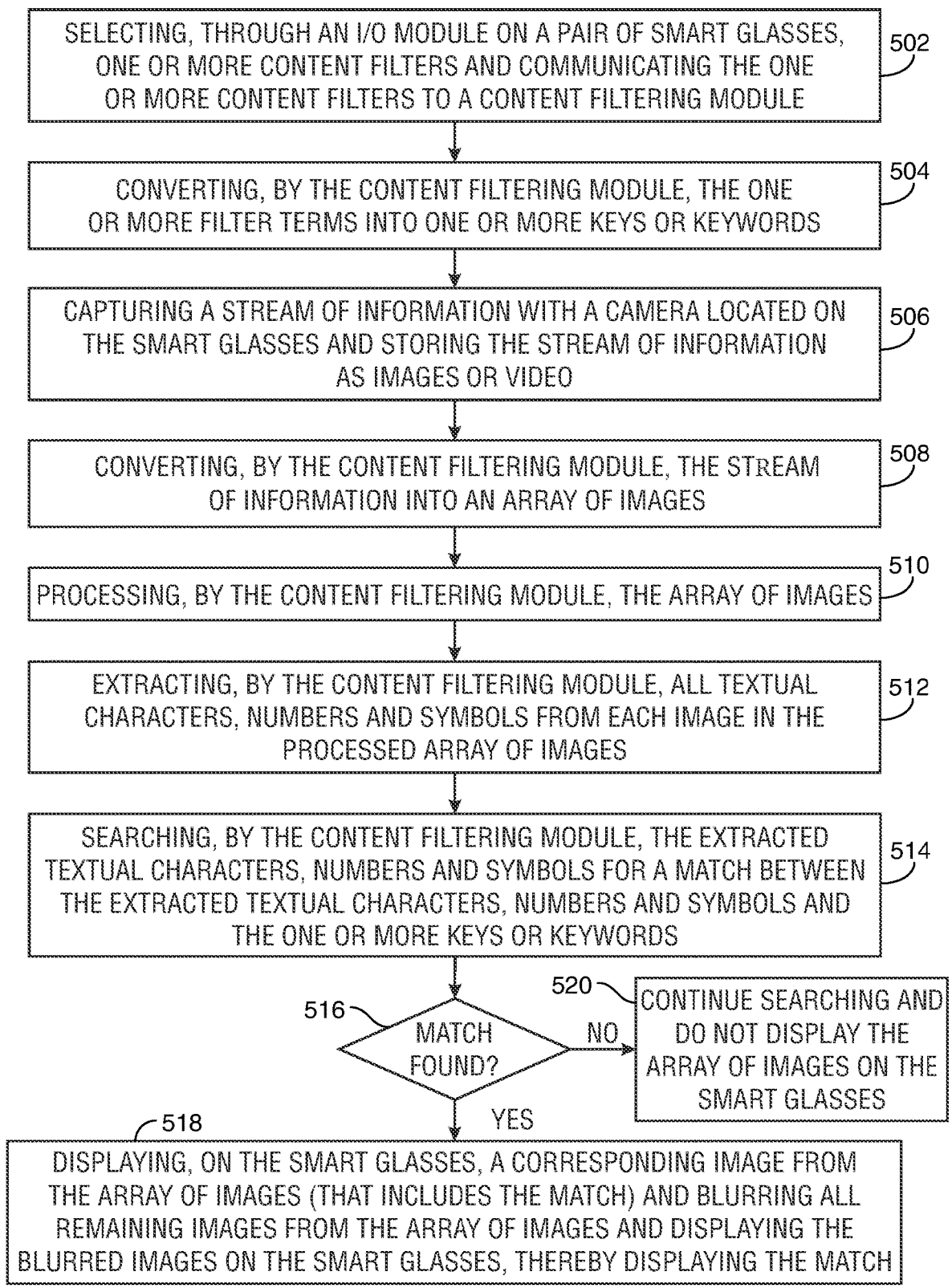
FIG. 5 shows an illustrative flowchart in accordance with the principles of the disclosure.

FIG. 5 shows an illustrative flowchart in accordance with principles of the invention. Methods may include some or all of the method steps numbered 502 through 520. Methods may include the steps illustrated in FIG. 5 in an order different from the illustrated order. The illustrative method shown in FIG. 5 may include one or more steps performed in other figures or described herein. Steps 502 through 520 may be performed on the apparatus shown in FIGS. 1-6, or other apparatus.

At step 502, one or more content filters may be selected and communicated to a content filtering module. The selection may take place by a user through an I/O module on a pair of smart glasses the user is wearing or using. The selection may occur through a voice command, a gesture, typing, or other suitable input method. The content filter(s) may include information desired by the user, such as flight information, stock information, or other information. In an embodiment, the content filter(s) are not selected by a user, rather they may be selected by a computer using one or more algorithms. The computer may mine a user's data to determine what information may be useful to the user and select that information. Alternatively, the content filters may be set in terms of advertisement(s) to be displayed to the user or not displayed to the user.

At step 504, the content filtering module may convert the content filter(s) into one or more keys or keywords. For example, if a user states, "I want information on flight 549 . . . ", the module may process that oral statement through natural language processing or other suitable methods and determine that the keys are "flight" and "549".

At step 506, a stream of information in the view of the smart glasses may be captured, as still or video images, by one or more cameras located on the smart glasses. For example, a user, wearing smart glasses, in an airport may look up at a flight information screen and the camera on the smart glasses may capture a video or still image of the flight information screen.

At step 508, the content filtering module may convert the stream of information captured by the camera into an array of images. For example, the flight information screen may include 20 rows of information, with each row including a single flight. The module may convert a single image of the stream of information into an array of 20 images, one for each row including flight information. The module may use one or more AI/ML algorithms, or other suitable algorithms, to perform this conversion. At step 510, the content filtering module may process the array of images to determine what, if any, textual characters (letters, numbers, symbols, etc.) are present in each image in the array. A typical process may be to use an optical character recognition ("OCR") algorithm on each image. At step 512, the module may extract all textual characters, numbers, and symbols from each image in the array so that the text may be searchable.

At step 514, the module may search the extracted text for a match between the extracted text and the keys or keywords. Any suitable searching algorithm may be used. At step 516, the module may determine if a match is found between the extracted text and the keys/keywords. The module may make this determination for each image in the array of images.

If a match is found, at step 518, the module may display the corresponding (to the match) image or images in the image array on a display of the smart glasses while also simultaneously, displaying the remaining images in the array in a blurred state. For example, if the stream of information is a flight information display, and one line of the stream of information contains the flight that was set in the content filter, the module may display the image from the array corresponding to that line of the stream of information and blur all of the remaining lines. This may serve to highlight the desired information.

If no match is found, at step 520, the module may continue searching the array of images and not display any image of the array of images until a match is found. The user may still see normally through the smart glasses.

Figure 6:
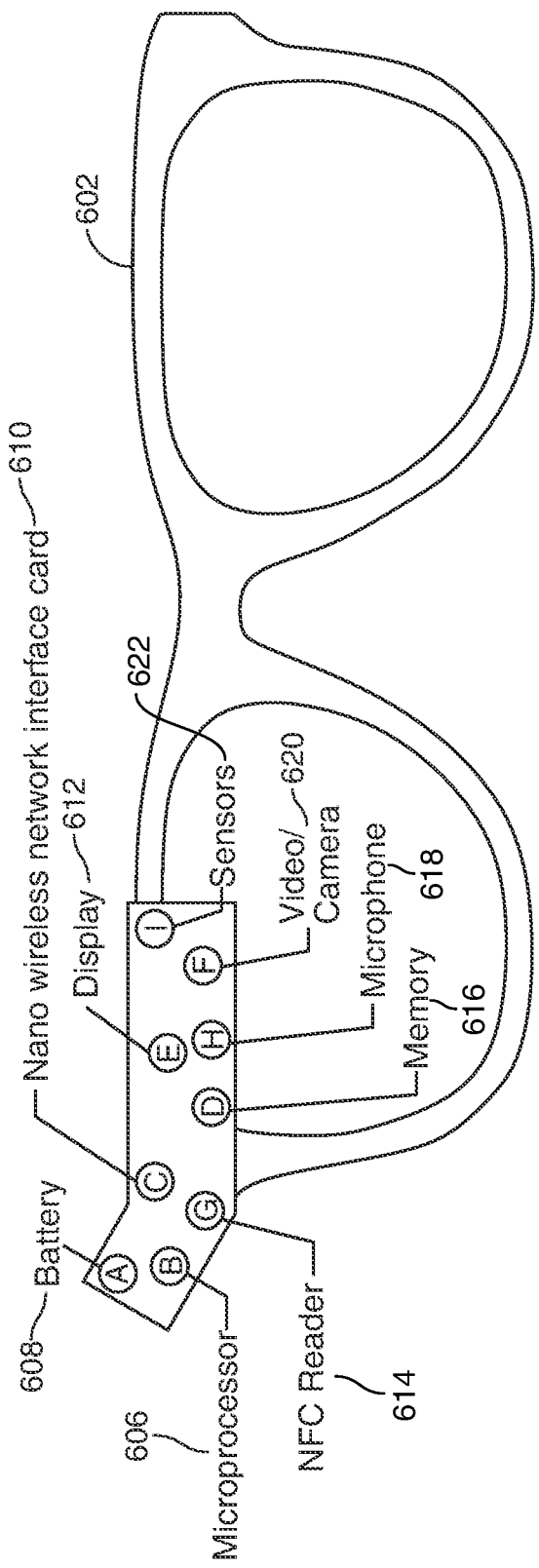
FIG. 6 shows an illustrative apparatus in accordance with the principles of the disclosure.

FIG. 6 shows illustrative smart glasses 602 in accordance with principles of the invention. Illustrative smart glasses 602 may include a plurality of hardware embedded in smart glasses 602. The plurality of hardware may include one, two, some, or all of hardware A-I illustrated in FIG. 6, and, in some embodiments, additional hardware not shown in FIG. 6.

The plurality of hardware may include battery 608 shown at A, microprocessor 606 shown at B, NFC reader 614 shown at G, nano wireless network interface card 610 shown at C, display 612 shown at E, sensors 622 shown at I, video/camera 620 shown at F, microphone 618 shown at H, and memory 616 shown at D. The functionalities of each of the aforementioned hardware elements is described in greater detail herein.

Battery 608 may power the other components of smart glasses 602, such as the display and the microprocessor. Microprocessor 606 may execute processing within smart glasses 602, such as the various controllers and applications described herein. Nano wireless NIC 610 may establish communication with a nearby wireless network. The wireless network may be used to communicate with other nodes on the network or servers. Display 612 may display software-based displays to the user, such as augmented reality displays. Sensors 622 may monitor various sensor inputs to smart glasses 302.

Video camera 620 may be operable to record a video or transmit a video or still images. The video may record or capture the view of smart glasses 602, including any livestream of information available in the view of the smart glasses 602. The video may be stored in memory 616. The video may be streamed to other nodes on the network and not stored in database 316. The video may include multiple frames.

Thus, apparatus and methods to extract and display data with smart glasses have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An apparatus for extracting and displaying key information on a pair of smart glasses comprising:
    the smart glasses comprising:
        a display;
        a camera;
        an input/output ("I/O") module;
        a network interface card ("NIC");
        a non-transitory memory configured to store an operating system; and
        a processor configured to operate at least:
            the operating system,
            the NIC; and
            the I/O module; and
    a backend computer comprising:
        a backend input/output ("bI/O") module;
        a backend network interface card ("bNIC");
        a backend non-transitory memory configured to store at least:
            a backend operating system; and
            a content filtering module; and
        a backend processor configured to operate at least:
            the backend operating system;
            the content filtering module;
            the bNIC; and
            the bI/O module;
    wherein:
        one or more content filters are transferred to the content filtering module by a mining module configured to automatically mine a user's emails and text messages with one or more artificial intelligence/machine learning ("AI/ML") algorithms;
        the camera captures a stream of information; and
        the content filtering module:
            converts the one or more content filters into one or more keys;
            converts the stream of information into an array of images;
            processes each image in the array of images to convert each image into text;
            searches the text for the one or more keys;
            when the module discovers one or more advertisements in one or more images in the array of images:
                deletes the one or more images comprising the one or more advertisements; and
            when the module discovers one of the one or more keys in the text:
                displays a corresponding image from the array of images on the display;
                surrounds the image with a box; and
                displays the remaining images from the array of images on the display.

2. The apparatus of claim 1 wherein the backend computer is a server.

3. The apparatus of claim 1 wherein the backend computer is a mobile device located proximate to the user.

4. The apparatus of claim 1 wherein the backend computer is wired to the pair of smart glasses.

5. The apparatus of claim 1 wherein the backend computer communicates wirelessly with the pair of smart glasses.

6. The apparatus of claim 1 wherein the content filtering module converts non-text inputs from the user into text via natural language processing.

7. The apparatus of claim 1 wherein the content filtering module is configured to use one or more artificial intelligence/machine learning ("AI/ML") algorithms.

8. The apparatus of claim 1 wherein the one or more content filters are communicated to the content filtering module by a user through the I/O module.

9. The apparatus of claim 1 wherein when the content filtering module displays the remaining images on the display, the module blurs the remaining images.

10. The apparatus of claim 1 wherein the stream of information is a livestream visible to the user through the pair of smart glasses.

11. The apparatus of claim 1 wherein the content filtering module provides one or more updates to the user after the user moves away from the livestream.

12. A method for extracting and displaying key information on a pair of smart glasses, the method comprising:
    communicating one or more filter terms to a content filtering module, wherein the one or more filter terms:
        are determined automatically by a mining module; and
        comprise one or more advertisement terms;
    capturing a stream of information with a camera located on the smart glasses;
    converting, by the content filtering module, the stream of information into an array of images;
    processing, by the content filtering module, the array of images;
    extracting, by the content filtering module, all textual characters, numbers, and symbols from the processed array of images;
    searching, by the content filtering module, the extracted textual characters, numbers, and symbols for a match between the extracted textual characters, numbers, and symbols and the one or more filter terms;
    when the content filtering module finds the match:
        displaying, on the smart glasses, a corresponding image from the array of images;
        displaying a box surrounding the corresponding image;
        when the match is to one or more of the advertisement terms, deleting the one or more images comprising the one or more advertisements; and
        blurring all remaining images from the array of images and displaying the blurred images on the smart glasses.

13. The method of claim 12 wherein the content filtering module is located at a mobile device proximate to the smart glasses.

14. The method of claim 12 wherein the content filtering module is located at a server remote from the smart glasses.

15. The method of claim 12 wherein the wherein the stream of information is a livestream visible to a user wearing the smart glasses.

16. The method of claim 15 further comprising providing updates, from the content filtering module to the user, after the user moves away from the livestream.

17. The method of claim 12 wherein the content filtering module is configured to use one or more artificial intelligence/machine learning ("AI/ML") algorithms.

18. An apparatus for extracting and displaying key information on a pair of smart glasses comprising:
the smart glasses comprising:
  a display;
  a camera;
  an input/output ("I/O") module;
  a network interface card ("NIC");
  a non-transitory memory configured to store at least:
    an operating system; and
    a content filtering module; and
  a processor configured to operate at least:
    the operating system,
    the NIC;
    the content filtering module; and
    the I/O module;
wherein:
  one or more content filters determined automatically by a mining module are communicated to the content filtering module;
  the camera captures a stream of information; and
  the content filtering module:
    converts the one or more content filters into one or more keys;
    converts the stream of information into an array of images;
    processes each image in the array of images to convert each image into text;
    searches the text for the one or more keys;
    when the module discovers one or more advertisement terms in one or more images in the array of images:
      deletes the one or more images comprising the one or more advertisements; and
    when the module discovers one of the one or more keys in the text:
      creates a virtual view within the display;
      cuts a key image corresponding to the discovered key; and
      displays the key image within the virtual view; and
    when the module finds one or more anomalies within the array of images, the module automatically highlights the one or more anomalies.

19. The apparatus of claim 18 wherein the content filtering module is configured to use one or more artificial intelligence/machine learning ("AI/ML") algorithms.

* * * * *